United States Patent [19]

Ishikawa et al.

[11] Patent Number: 5,773,124
[45] Date of Patent: Jun. 30, 1998

[54] MAGNETIC RECORDING MEDIUM COMPRISING A PROTECTIVE LAYER HAVING SPECIFIED ELECTRICAL RESISTIVITY AND DENSITY

[75] Inventors: Fuminori Ishikawa, Hitachioota; Hideaki Tanaka, Katsuta; Toshinori Hirano, Hitachi; Hiroko Saito, Hitachi; Kenichi Gomi, Hitachi; Hiroshi Yashiki; Youichi Inomata, both of Odawara; Yoshihiro Moriguchi, Hiratsuka, all of Japan

[73] Assignee: Hitachi, Ltd., Tokyo, Japan

[21] Appl. No.: 198,592

[22] Filed: Feb. 18, 1994

[30] Foreign Application Priority Data

Feb. 22, 1993 [JP] Japan .................................. 5-031690

[51] Int. Cl.$^6$ ........................................................ G11B 5/72
[52] U.S. Cl. ........................ 428/141; 428/212; 428/218; 428/408; 428/694 TS; 428/694 TP; 428/694 TC; 428/694 TR; 428/900; 428/931; 204/192.16
[58] Field of Search .......................... 428/694 T, 694 TP, 428/694 TC, 694 TZ, 408, 900, 141, 694 TS, 694 B, 694 BS, 931; 204/192.1, 192.2, 192.32; 425/694 TR, 694 BR

[56] References Cited

U.S. PATENT DOCUMENTS

| | | | |
|---|---|---|---|
| 4,861,662 | 8/1989 | Kobliska et al. ....................... 428/408 |
| 5,030,494 | 7/1991 | Ahlert et al. .............................. 428/64 |
| 5,045,165 | 9/1991 | Yamashita .......................... 204/192.16 |
| 5,080,971 | 1/1992 | Yokohama et al. ..................... 428/336 |
| 5,227,211 | 7/1993 | Eltoukhy .................................... 428/64 |
| 5,232,791 | 8/1993 | Kohler et al. ..................... 428/694 TC |
| 5,316,844 | 5/1994 | Suzuki et al. ........................... 428/323 |
| 5,397,644 | 3/1995 | Yamashita ............................... 428/408 |

Primary Examiner—Stevan A. Resan
Attorney, Agent, or Firm—Antonelli, Terry, Stout, & Kraus, LLP

[57] ABSTRACT

This invention relates to the magnetic recording medium, its manufacturing method and the magnetic disk apparatus, in which the ferromagnetic thin film is formed on the substrate board, and the protective layer is provided on that. A Magnetic recording medium of the has at least one layer of the protective layer on the magnetic surface, which is characterized in that the surface of the protective layer is provided with the high noncontinuous large resistance layer, and the density of the surface of the protective layer is higher than other regions other than the said surface.

The magnetic recording medium has the surface of the protective layer which contains at least one kind or more of the element of the inert gas element, the halogen element and hydrogen.

Therefore, when making a lower flying height of the magnetic head is achieved, the slide durability over the long term is improved, particularly, the slide durability of the magnetic disk apparatus using the MR head can be improved.

29 Claims, 5 Drawing Sheets

MAGNETIC RECORDING MEDIUM COMPRISING A PROTECTIVE LAYER HAVING SPECIFIED ELECTRICAL RESISTIVITY AND DENSITY

BACKGROUND OF THE INVENTION

This invention relates to the magnetic recording medium, its manufacturing method and a magnetic disk apparatus, in which a ferromagnetic thin film is formed on a substrate and a protective layer is provided thereon.

In recent years, as an external information storage device of a computer system, the importance of the magnetic disk apparatus has become more and more significant, and the recording density of the magnetic disk has rapidly increased year by year. Furthermore, there has been an increased demand for a thin film type magnetic disk of high recording density using a magnetic thin film, rather than a coated type medium having a magnetic paint formed by blending a conventional magnetic powder and a binder on a substrate.

To achieve a thinner protective layer film formed on a magnetic disk, it has been proposed to employ a modification of a C protective layer on the disk. For example, Japanese Patent Application Laid-open No. 63-102014 describes a method of introducing metals, such as Co, into a graphite C film. Japanese Patent Application Laid-open No. 63-102015 describes a method of introducing a material of the Si compounds into the graphite C film. Japanese Patent Application Laid-open No. 3-105714 describes a method of ion-implanting a specific atom.

SUMMARY OF THE INVENTION

One object of this invention is to provide a magnetic disk that has a good durability over the long term; as well as a manufacturing method and a magnetic disk apparatus for making and using such a magnetic disk, particularly, a magnetic disk apparatus using an MR head.

Another object of this invention is to provide a magnetic disk whose anti-corrosion property is higher than conventional magnetic disks, and to provide a magnetic disk apparatus whose durability is higher under various environments.

To achieve the objectives described above, this invention is characterized in that, in a magnetic recording medium having at least one protective layer on a magnetic surface, a noncontinuous, large resistivity film portion is provided as part of the surface of the protective layer.

This invention is also characterized in that, in a magnetic recording medium having at least one protective layer on a magnetic surface, the surface resistivity, which represents the resistivity in the direction of the surface of the protective layer, is higher than the volume resistivity, which represents the average resistivity in the film thickness direction of the protective layer.

This invention is characterized in that, in a magnetic recording medium having at least one protective layer on a magnetic surface, the resistivity of the surface of the protective layer is higher than the resistivity on the side thereof which is in contact with the magnetic surface.

This invention is further characterized in that, in a magnetic recording medium that has at least one protective layer on a magnetic surface, the density of the surface of the protective layer is higher than the density on the side thereof in contact with the magnetic surface. Here, the density of the protective layer becomes higher in the direction approaching the surface.

This invention is characterized in that, in a magnetic recording medium having at least one protective layer on a magnetic surface, the surface resistivity, which represents the resistivity in the direction of the surface of the protective layer, is higher than the resistivity of other regions than the surface, and the density of the surface of the protective layer is higher than the density of the other regions.

This invention is characterized in that, in a magnetic recording medium having at least one protective layer on a magnetic surface, the surface of the protective layer contains at least one kind of element, such as an inert gas, a halogen gas or hydrogen. In either magnetic recording media mentioned above, the magnetic surface is substantially flat, the film thickness of the protective layer is nonuniform, and the surface of the protective layer has projections.

The area ratio of the top flat area, or the height of the projections, greatly influences the slide durability and the anti-sticking property of the CSS (Contact Start Stop) yield strength etc.

To accommodate a lower flying height for the magnetic head, it is desirable that the projection height be made uniform. While the height of the projections has only to be controlled in accordance with the flying height of the magnetic head, in the range of flying heights of 20–100 nm, a range of 5–40 nm for the height of the projections is desirable.

Regarding the ratio of the projections to the surface area, from the point of view of the anti-abrasion property and the anti-sticking property, it is desirable that the overall area ratio of the surface flatness part in each projection is in the range of 0.1 to 80%. Within the range of flying heights of 35–100 nm, a range of 0.5 to 5% is especially desirable. If the flying height is less than 35 nm and the magnetic head frequently contacts the magnetic disk, a range 2 to 30% is especially desirable.

The area of the flat part of each projection is determined so that the magnetic head does not touch a recess. For the overall specific projection area ratio, when each projection area is made large, so that the space of adjoining projections becomes large, a smaller projection area is desirable. While the slider size of the magnetic head that is used also is relevant, each desirable projection area is an average 0.04–10 $\mu m^2$ or less. The desirable space between abutting projections is less than 50 $\mu m$ on the average, and a space below 20 $\mu m$ is especially desirable. The area and the pitch of each projection do not need to be uniform, and so a random distribution is desirable in a preferred case.

The ratio of the projections to the surface area can be used to specify the number of projections, that is, the density. For the number of the projections for each projection area, for example, what is shown in the following is desirable.

In case of 10 $\mu m^2$, 100–30000 N/mm$^2$.
In case of 5 $\mu m^2$, 200–100000 N/mm$^2$.
In case of 1 $\mu m^2$, 1000–800000 N/mm$^2$.
In case of 0.25 $\mu m^2$, 4000–3200000 N/mm$^2$.
In case of 0.04 $\mu m^2$, 25000–20000000 N/mm$^2$.

For example, what is shown in the following is especially desirable.

In case of 10 $\mu m^2$, 500–30000 N/mm$^2$.
In case of 5 $\mu m^2$, 1000–60000 N/mm$^2$.
In case of 1 $\mu m^2$, 5000–300000 N/mm$^2$.
In case of 0.25 $\mu m^2$, 20000–1200000 N/mm$^2$.
In case of 0.04 $\mu m^2$, 125000–7500000 N/mm$^2$.

Here, as a specific detecting method for each projection area and the number of projections, for example, an optical microscope photograph or an electron microscope photograph of the disk surface is taken, and the contrast indicating the difference of the film thickness is obtained by image processing, etc. Measurement can be performed by STM and AFM, etc., and the image can be processed likewise. Optical thickness monitors, such as an ellipse meter, etc. can be used suitably. When determining the overall area ratio of the projection, as an example, the disk surface is scanned by a contact profilometer, and the relative contact area ratio curve, a so-called bearings curve, is obtained, and the contact area ratio in the specified projection height can be determined.

This invention is characterized in that, in a magnetic recording medium that has at least one protective layer on a magnetic surface, the magnetic surface is substantially flat, and the film thickness of the protective layer is nonuniform in that projections are formed on the surface of the protective layer and the resistivity and/or the density of said recess surface of the protective layer are higher than that of the portion beneath the high resistivity layer. This invention is characterized in that, in the method of manufacturing a magnetic recording medium, which has at least one protective layer on a magnetic surface, the following processes are utilized: (i) a process that forms the protective layer by a sputtering method or a plasma CVD method, and (ii) a process in which plasma processing is carried out on the protective layer surface and the resistivity and/or the density of the surface are made higher than the inside portion of the protective layer. Here, after the protective layer forming processes, such as sputtering, inclusion of a process that forms an uneven-surface on the protective layer is desirable. Here, it is desirable that plasma processing is performed on the surface of the recess of the protective layer, and the density of the recess surface is made higher than the density of the inside portion below the recess.

What is described in the following is especially desirable. After forming the protective layer, the surface of the protective layer is partially masked, etching is performed using a gas such as oxygen after this, and the part that is not covered with the mask is etched selectively, so that projections are formed. After the above processing, plasma processing is performed using a gas including of at least one kind of inactive element, such as Ar, He, Ne and $N_2$, a halogen element and hydrogen, so that the recess surface is improved.

This invention is characterized in that, a magnetic disk apparatus for use with the magnetic disk having the above-mentioned magnetic recording medium, includes a magnetic head which touches the magnetic disk surface, means for rotary control of the magnetic disk, means for positioning the magnetic head, and means for processing a signal generated by the magnetic head.

This invention is characterized in that, in the magnetic recording apparatus mentioned above, an MR head is provided as a magnetic head, and the range of the flying height of the magnetic head is 20–75 nm. It is desirable from the point of view of wear durability that the resistivity and/or the density of the protective layer is made higher in the neighborhood of the surface part of the disk. As mentioned above, particularly in a magnetic recording apparatus using a MR head, regarding the resistivity of the protective layer surface, from the point of view of dielectric property, a higher resistivity is desirable. While there is the possibility of an accumulation of a static charge on the protective layer, because an accumulation of charge depends on the resistivity of the whole protective layer, by merely making the resistivity of the protective layer surface higher, the accumulation of static charge is not promoted. For a volume resistivity representing the average resistivity in the film thickness direction of the protective layer, and a surface resistivity representing the resistivity in the lateral direction in the surface of the protective layer, it is desirable that the surface resistivity is made higher than the volume resisitivity.

Increasing the resistivity of the protective layer surface also has the effect of improving the anti-corrosion property of the magnetic disk. When a film defect exists in the protective layer, moisture enters the film defect, and the metal of the magnetic layer is eroded by the effect of electrolysis, resulting in a reduction of the magnetic signal output, etc. Increasing the resistivity of the protective layer surface has the effect of suppressing this local corroding action.

Because the higher density of the protective layer makes the film close-packed, the anti-abrasion property of the disk is improved. In accordance with this invention, only the surface of the protective layer is modified to have a high strength, and so, by avoiding any increase in the brittleness of the protective layer, the wear durability can be improved without reduction of the adhesion property of the protective layer to the magnetic layer or an increase of the internal stress thereof. By increasing the resistivity and improving the density of the protective layer surface, a compact structure can be achieved, and by providing a thinner film for the protective layer, it is possible to make the space between the magnetic head and the magnetic layer surface small, having the effect of providing a higher recording density. The thinner protective layer is good, and 100 nm or less is good, while 5–40 nm is desirable.

The material of the protective layer used for the surface treatment is composed of one of the following: (i) carbon; (ii) mainly carbon containing hydrogen, Si, or metal oxides, such as Fe, Ni and Co; and (iii) $SiO_2$ material. However, the invention is not limited to these examples. Using carbon material has the effect that amorphous C formed by the sputtering method is especially notable.

As means of achieving a higher resistivity or a higher density in the protective layer surface, surface improvement by plasma processing in a gas atmosphere is desirable. That is, gas is supplied to the vacuum vessel until it becomes a constant pressure, and to the electrode facing the substrate holder in which the disk is mounted, electric power, such as DC or rf, is applied, so that a plasma is generated.

This is carried out so that the effect of the improvement is enhanced without subjecting the protective layer to possible damage. As the gas that is used, the type of gas used as an etching gas in a semiconductor process is desirable. Particularly, an inert gas such as Ar, He, Ne and $N_2$, carbon fluoride series gases, such as $CF_4$, $C_2F_6$ and $CHF_3$, hydrogen, etc. are desirable. In the course of gas plasma processing, an element of the gas used for plasma processing is absorbed in the surface of the protective layer. As a result, the physical or chemical properties of the protective layer surface portion that contains the gaseous element is different from those of the original protective layer. For example, the C—C network structure changes by absorbing the different elements in the case of an amorphous C protective layer. Because the resistivity and the density are changed by the element quantity that is absorbed, it is desirable that a suitable element quantity be determined by a change of the time of electric power supply or the electric power that is supplied during the plasma processing. In this regard, 5 at % or less is normally good, and 1 at % or less is desirable. When an ion and a radical of the etching gas in the plasma collide on the surface of the protective layer, the temperature near the surface of the protective layer rises due to the collision energy, and an annealing effect resulting in the atom of the protective layer being rearranged contributes to an increase of the resistivity and the density of the surface of the layer. Gas plasma processing in accordance with this invention has the effect of improving the coverage of the protective layer. By the effect mentioned above, if a lubricant is coated on the protective layer, the lubricating layer can be formed uniformly. Therefore, when the lubricating layer is formed on the magnetic disk, the stability of the lubricating layer improves performance, and as a result, a magnetic disk apparatus of high durability can be provided.

If the supplied electric power at the time of plasma processing is large, or if the electric power supplying time is long, the increase in the rate of change of the resistivity and the density is larger, and the thickness of the modified layer increases. A range that is not harmful to the adhesion property with the under-layer is desirable as far as the film thickness of the modified layer portion is concerned, and a film thickness of 30% or less of the thickness of the protective layer is desirable. The relationship between the film thickness of the modified layer portion and the supplied electric power and the electric power supplying time is different according to the gas that is used. As for the gas used in the plasma processing, a single gas is fine, and a mixture of gases is also fine. Also, the disk can be processed in two steps by using a single gas of different kinds in the respective steps.

The plasma surface treatment of this invention has the effect of removing any projection that represents an abnormal growth part of the film that arises when forming the protective layer, or contamination, such as dust that adheres to the surface when forming the film. That is, the invention performs a cleaning effect on the surface, making it possible to achieve a protective layer surface which is flat, thereby accommodating a magnetic head having a lower flying height. Thus, it is suitable for use in a magnetic disk apparatus having a magnetic head with a flying height of 100 nm or less. Particularly, it is suitable for use in the magnetic disk apparatus having a flying height of 75 nm or less, or even the more desirable range of 50 nm or less, and as the flying height is small, the effect of plasma surface treatment of this invention is remarkable.

In the plasma surface treatment according to this invention, after formation of the protective layer, the formation of projections on the protective layer surface, especially, produces a significant effect. There are various methods to form projections. For example, a mask may be coated uniformly and etched partially by conventional methods, such as a wet etching process or a dry etching process. At this time, the protective layer surface degenerates due to this projection formation process, and there is the possibility of harming the durability of the surface. The plasma surface treatment of this invention has the effect of preventing this reduction in durability.

That is, the invention is effective in that it calls for partial processing without processing by plasma surface treatment of the entirety of the protective layer. If projections are formed on the protective layer, the plasma surface treatment is applied to the recess parts between the summit parts of the projections, and so the surface resistivity or the density of the recess is made large. As a result, the wear strength can be improved. If the magnetic head contacts the magnetic disk in the magnetic disk apparatus during operation, dust often lies between the head and disk. When projections exist in the protective layer, there is a tendency that the dust will easily adhere in the recess. Therefore, it is important to improve the wear strength of the recess to secure the durability of the magnetic disk apparatus. The desirable height of the projections is 10–30 nm. For example, for forming of projections on an amorphous C protective layer, the C protective layer is formed by well-known methods, such as sputtering, after which, the fine particles of organic or inorganic matter, with the anti-etching property that is described below, are dispersed as a mask on the protective layer; for example, one may use a polytetrafluoroethylene (PTFE) particle, a polystyrene particle, the SiC particle, an $Al_2O_3$ particle, a $SiO_2$ particle, etc. Then, only the part that is not covered by the mask is etched by a physical or chemical method.

As a method of dispersing fine particles on the protective layer, fine particles are dispersed in a proper solvent, and a suspension is manufactured. This suspension has only to be coated on the protective layer surface by using a well-known coating method, such as electrostatic spray coating, spin coating, dip coating, etc. The method of coating has only to be selected suitably according to the material of the mask. Electrostatic spray coating and spin coating are suitable for having a high charging property, while dip coating is suitable for having a low charging property. The solvent has only to be selected suitably according to the kind of the fine particle. For example, a fluorine containing solvent has only to be selected in case of use of a PTFE particle. In coating a suspension on the protective layer, it is desirable that the solvent should evaporate promptly.

At the time of the etching, if the gas plasma apparatus mentioned above is used, because formation of the projections and the surface improvement are achieved simultaneously, the number of processes is reduced.

However, in forming of the projections, it is necessary to form the projections with a uniform height in a short time. For this objective, if the dry etching method is used, it is desirable that $O_2$ is selected, since $O_2$ has a combustible action, making it possible to form uniform projections over the whole disk area in a short time. But, $O_2$ etching invites the protective layer structure to be hydrophilic. And, in the lubricant coating process, the formation of the homogeneous lubricating layer must be checked, since there is the possibility of harming the durability or the anti-corrosion property as a result. Therefore, it is necessary that the surface be improved by gas plasma processing, so that the resistivity and the density are heightened, and the wetting property for water is suppressed. As mentioned above, the present invention has a large effect especially in a disk that is formed with uniform projections on the protective layer surface.

After etching, since it is necessary to perform a process that eliminates the fine particles used as a mask by washing with water, it is further suitable to provide gas plasma processing over the whole of the C protective layer, after eliminating the fine particles.

By proper selection of the gas that is used at the time of gas plasma processing, as well as the increase of the resistivity and/or the density in accordance with this invention, the chemical property of the surface is controlled, and the adhesive force with the lubricant can be controlled. If $N_2$ gas and $H_2$ gas are used in the gas plasma processing, an amide group is formed on the surface, and the adhesive force of the lubricant, which has an end group which exhibits a high adhesive force to the amide group, increases. If fluorine containing gas is used, the hydrophilicity of the surface can decline, and a chemically stable surface can be formed.

By gas plasma processing, after forming a new active surface, when the magnetic disk is taken out into the atmosphere, the formed new surface reacts with $O_2$; and, while there is a possibility that it is different from the surface-form of the object, this, for example, after gas plasma processing, can be evaded easily by making vent gas react in $CF_4$.

As stated above, in the magnetic disk of this invention, by gas plasma processing, because the resistivity and the density of the surface part of the protective layer are made large, when low spacing of the magnetic head is required, it is still possible to ensure a high wear durability. Particularly, in a magnetic recording apparatus using a MR head, without an increase in the adhesion of dust, at the time that the MR head is electrically powered, the dielectric property can be raised. A protective layer surface of higher density can improve the slide strength without harming the adhesion property with the magnetic layer.

DETAILED DESCRIPTION OF THE PREFERRED EMBODIMENTS

As shown in the following, the example of this invention is described in detail.

EXAMPLE 1

Figure 1:
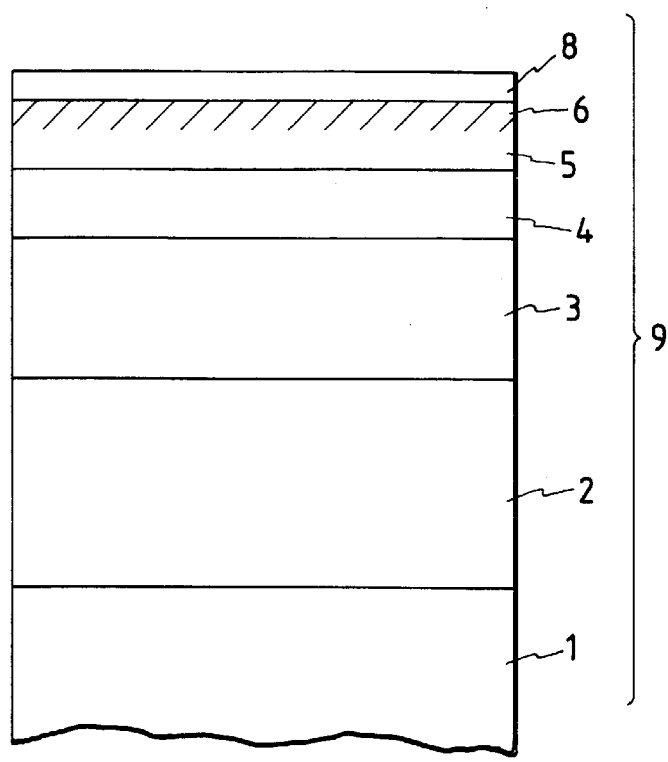
FIG. 1 is a sectional diagram of the configuration of a magnetic disk of this invention.

The cross-sectional configuration of a magnetic disk in accordance with this invention is shown in FIG. 1. On the surface of an aluminum alloy disk 1 having an outside diameter of 5.25 inches, an NiP under-layer 2 of 15 $\mu$m thickness was formed by an electroless deposition method. The under-layer 2 was polished so as to be 10 $\mu$m. A measurement was performed using a contact profilometer, and a mirror surface manufacturing process was performed so as to achieve an average roughness (Ra) of 5 nm and a maximum roughness (Rmax) of 15 nm. On this substrate, by the sputtering method, a Cr intermediate layer 3 was formed to 100 nm, a CoNi magnetic layer 4 was formed to 50 nm, and an amorphous C protective layer 5 was formed to 50 nm.

Figure 2:
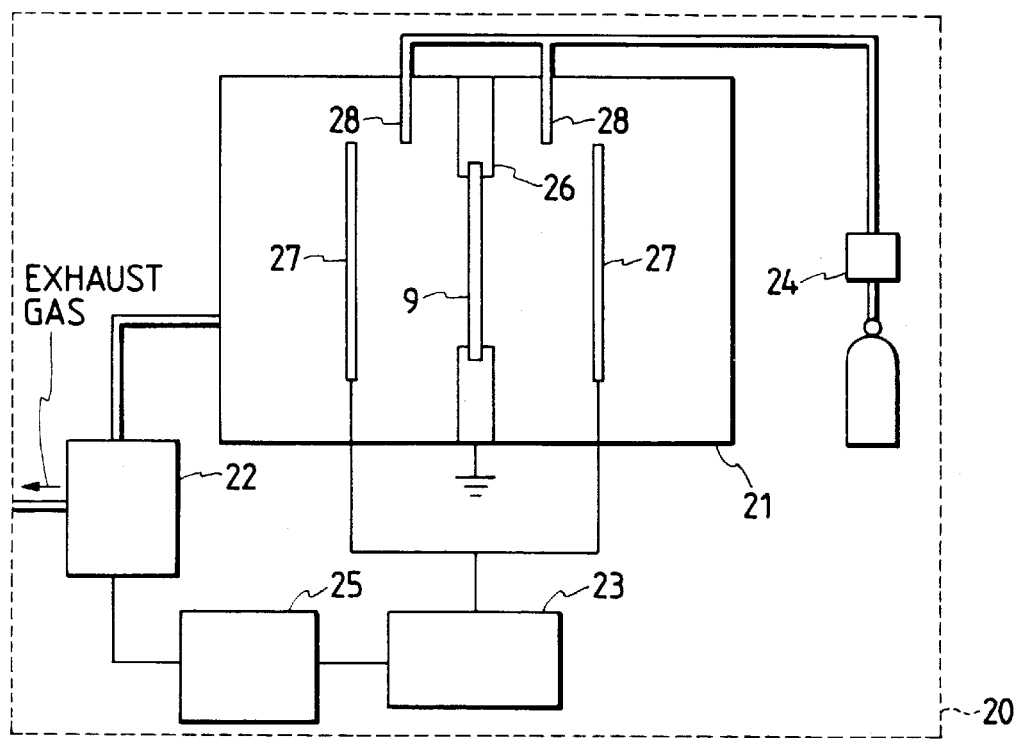
FIG. 2 is a schematic block diagram of a gas plasma processor that may be used to form the magnetic disk of this invention.

Gas plasma processing was performed on this disk by apparatus 20 shown in FIG. 2. The plasma processor comprises vacuum chamber 21, vacuum exhaust system 22, electric power supply system 23, gas introduction system 24 and control part 25. In vacuum chamber 21 there were disposed substrate holder 26 in which the magnetic disk is held, electrodes 27 facing both sides of the magnetic disk and mechanism 28 through which gas is introduced into the chamber 21. Magnetic disk 9 was installed in substrate holder 26 of this apparatus 20; and, after vacuum exhaustion until the inside of the vacuum chamber 21 became $10^{-6}$ Torr, 100 sccm of Ar gas was introduced into the chamber. The pressure was adjusted to 0.1 Torr, and 800 W rf high frequency electric power was applied to the electrode 27 for 10 seconds. A modified surface portion 6 was obtained by this processing. It was proved that the film thickness after processing was decreased 10 nm in comparison with the film thickness before processing.

When the surface of this magnetic disk was analyzed by the XPS (X-ray Photoelectron Spectroscopy) method, Ar of 0.5 at % was detected in the surface. The peak intensity of C of the magnetic disk surface by the XPS analysis at this time was 2000 kcps. As the density of C increases, the peak intensity of C shows a large value in the XPS analysis. When the resistivity of this magnetic disk was measured by the four terminal method, the resistivity was $5 \times 10^9$ $\Omega$cm. Before the Ar processing, the peak intensity and the resistivity of the C layer 5 of the magnetic disk were 1400 kcps and $5 \times 10^6$ $\Omega$cm, respectively. After the Ar processing, the existence of the modified surface portion 6 was confirmed.

The surface of the magnetic disk was polished mechanically by 15 nm, followed by XPS analysis of the surface and a resistivity measurement. In this case Ar was not detected, the peak intensity of C was 1400 kcps, and the resistivity was $5 \times 10^6$ $\Omega$cm. It was confirmed that the modified surface portion 6 of the C protective layer 5 of the magnetic disk in accordance with this invention had a resistivity and a density which is larger than the inside portion of the layer 5. The thickness of the modified surface portion is presumed to be 15 nm or less. In addition, the AES (Auger Electron spectroscopy) spectrum, the high sensitivity infrared reflection spectrum and the Raman spectrum were obtained for the magnetic disk surface before and after the Ar processing, so that an increase of the related peak intensity of C was detected.

Figure 3:
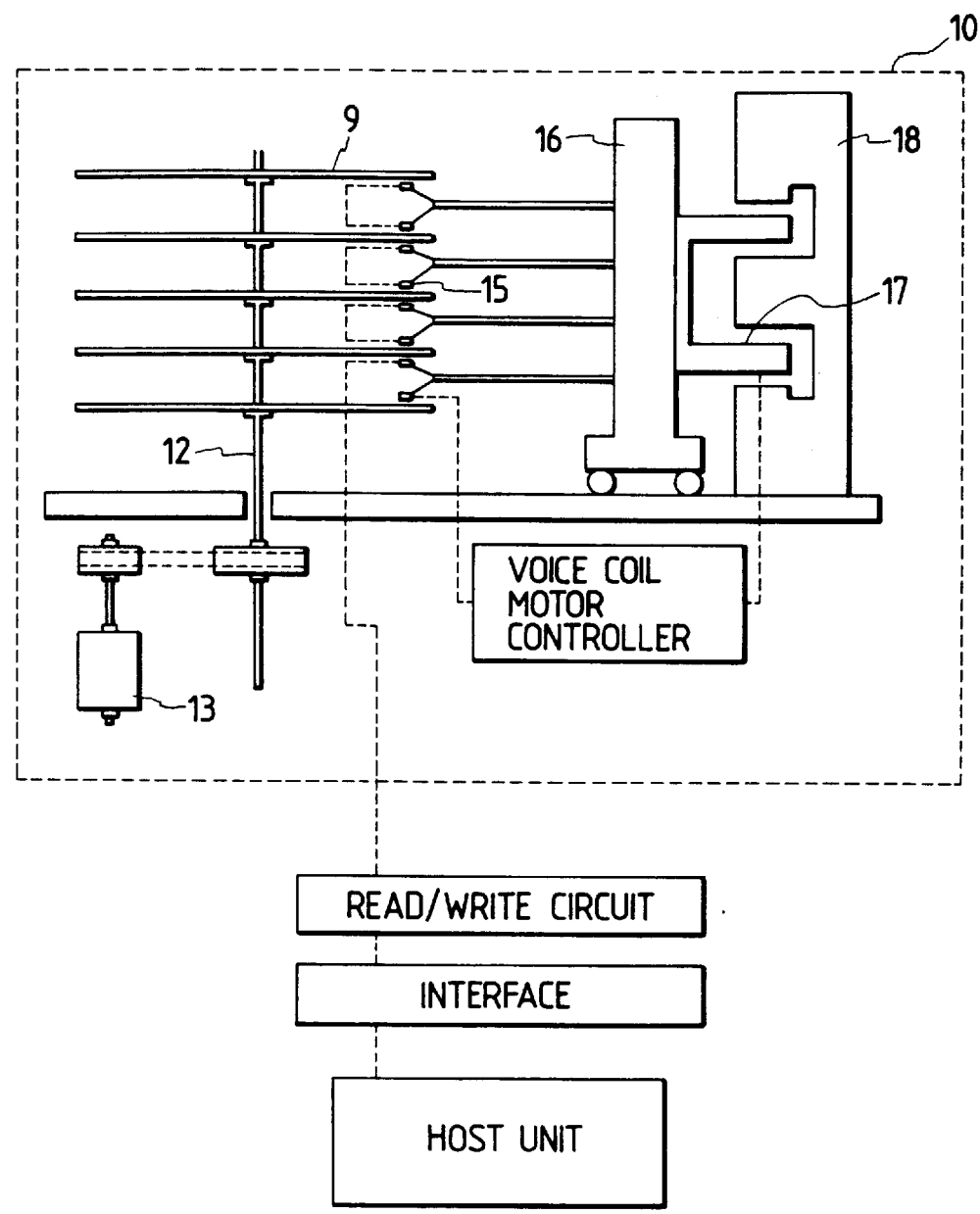
FIG. 3 shows a magnetic disk apparatus on which the magnetic disk of this invention may be mounted.

On the surface of the disk thus obtained, a lubricating layer 8 of perfluoropolyethers lubricant was coated to about 5 nm. This magnetic disk 9 was mounted on the magnetic disk apparatus 10 shown in FIG. 3, and a seek test was performed. The magnetic disk apparatus comprises shaft 12 in which magnetic disk 9 is held, spindle motor 13 which rotates the disk 9, magnetic heads 15, carriage 16 that makes it move to the specified position on the magnetic disk, voice coil motor comprising magnet 17 and coil 18, control part, etc. The flying height of the head during the seek test was 0.08 $\mu$m. Environmental conditions at the time of the seek test were a temperature of 30 degrees centigrade, and a humidity of 90% RH. After 2000 hours of the seek test, a change in output of the magnetic recording of the magnetic disk apparatus was not recognized, and the initial state of the disk was maintained. When dirt, etc. of the magnetic head and the magnetic disk were observed, an adhesive substance, corrosion, etc. were not observed. From the above result, it was confirmed that magnetic disk 9 and magnetic disk apparatus 10 exhibited an abrasion durability over the long term.

EXAMPLE 2

Figure 4:
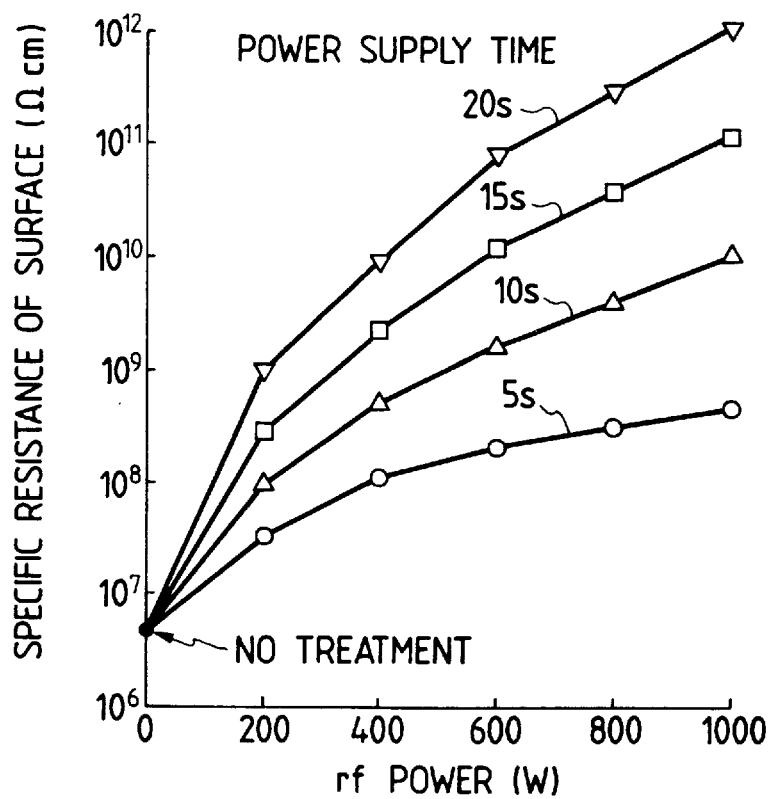
FIG. 4 illustrates a relationship between rf electric power and surface resistivity.
Figure 5:
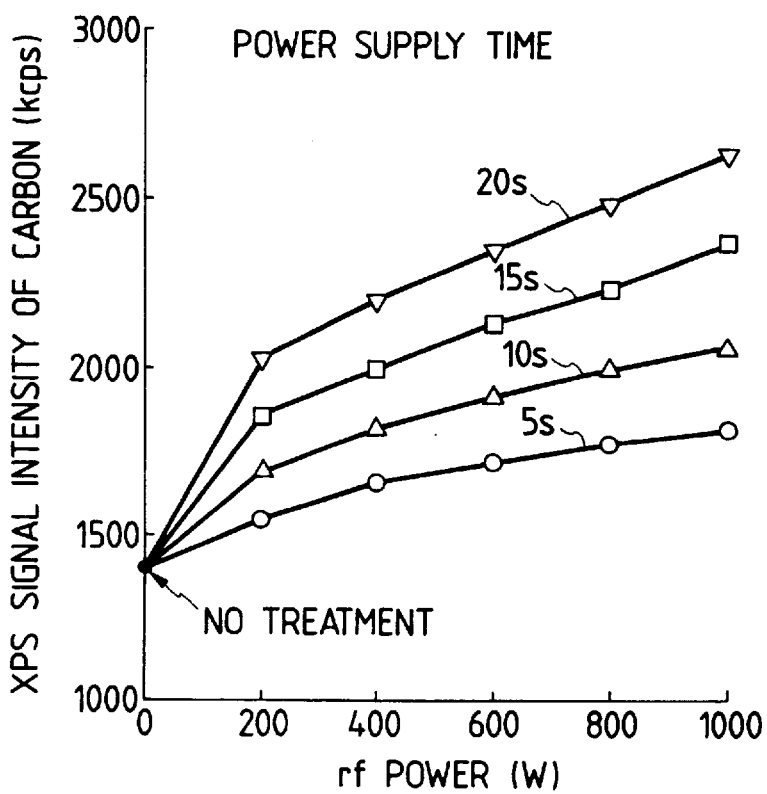
FIG. 5 illustrates a relationship between rf electric power and the XPS peak intensity of the carbon protective layer.

Under the conditions of the Ar gas plasma processing of Example 1, the rf high frequency electric power was changed to 200, 400, 600, 800 and 1000 W, and the electric power supplying time was changed to 5, 10, 15 and 20 seconds. The surface resistivities of the C protective layer obtained under these conditions are shown in FIG. 4. The XPS peak intensities of C are shown in FIG. 5. In FIG. 4 and FIG. 5, the point at which the rf high frequency electric power is zero after sputtering represents the condition that plasma gas processing was not performed. In FIG. 4 and FIG. 5, it is proved that the resistivity and the C peak intensity become larger with an increase of the rf high frequency electric power. The magnetic disk, processed under the conditions shown in FIG. 4 and FIG. 5, was mounted on a magnetic disk apparatus similar to that of Example 1. The seek test was performed and a result similar to Example 1 was obtained.

EXAMPLE 3

The plasma processing gas of Example 1 was changed to $N_2$, He, $H_2$ and $CF_4$, respectively, and plasma processing was performed for respective magnetic disks. Each magnetic disk was mounted on the magnetic disk apparatus, and the seek test was performed under conditions in which the temperature was 30 degrees centigrade and the humidity was 90% RH. Results similar to Example 1 were obtained.

EXAMPLE 4

Figure 6:
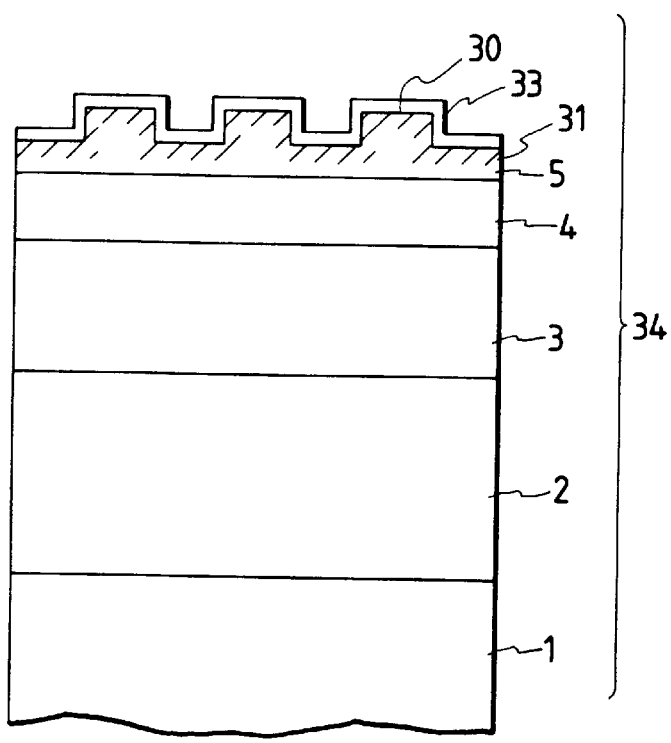
FIG. 6 is a sectional diagram of a magnetic disk of this invention.
Figure 8:
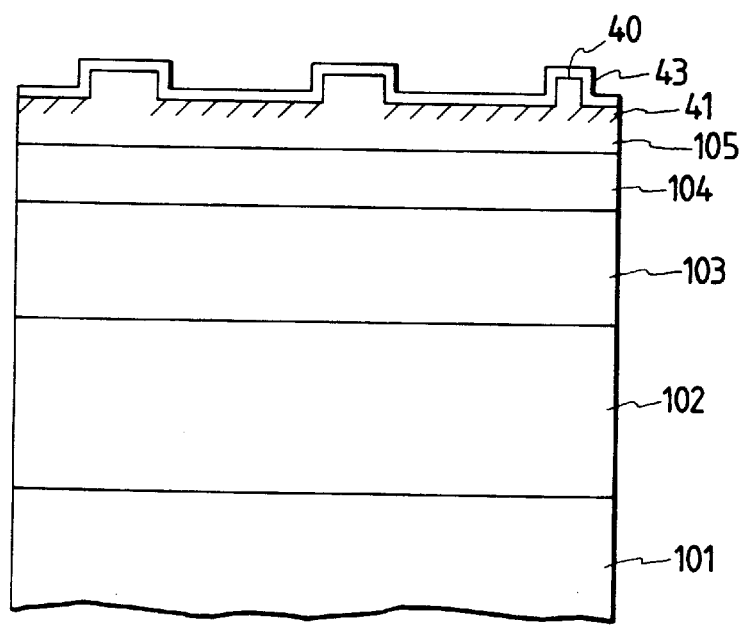
FIG. 8 is a sectional diagram of a magnetic disk of this invention.

The cross-sectional configuration of a magnetic disk representing another example of this invention is shown in FIG. 6. In manufacturing a magnetic disk, the same process as described in Example 1 was adopted until the CoNi magnetic layer 4 was formed. The C protective layer was then formed on the magnetic layer by a sputtering method to a thickness of 50 nm. Small projections were formed on the C protective layer by the following method. A suspension was prepared in the following manner. PTFE particles having an average grain diameter of 5 μm were dispersed to a fluorine containing solvent ultrasonically at the rate of 1 wt %. On the surface of the C protective layer, a PTFE suspension was coated by spin coating through use of a pump and a nozzle.

Then, the solvent was evaporated, and the PTFE particles were dispersed on the C protective layer. The state of the adhesion of the PTFE particles was observed under an optical microscope. As a result, 90% or more of the adhesive particles had a particle size of 1 to 10 μm, and the space between particles for the average of the particles was about 15 μm, and the particle density per unit area was about 2500N/mm². The whole area of the coating part of the particles was 5% per the disk area. This disk was installed in plasma processor 20 of example 1, and processing was carried out in an Ar atmosphere, and so that part of the C protective layer not covered by the PTFE particles was etched by 15 nm. Scrub washing of the surface was then performed with pure water, and the PTFE particles were eliminated. From the result of surface observation before and after plasma processing, it was confirmed that projections having almost the same size as the adhered particles were formed on the surface of the C protective layer. When measuring the surface resistivity of the protective layer of this magnetic disk, a resistivity of $10^9$ Ωcm and the existence of a surface modified layer 31 were confirmed.

As stated above, the surface of the obtained disk was coated with a lubricating layer 33 of perfluoropolyethers lubricant to about 5 nm, and magnetic disk 34 was manufactured. Magnetic disk apparatus 10 provided with an MR head as a reproducing head was loaded with magnetic disk 34 manufactured in this example, and a seek test similar to Example 1 was done. After 2000 hours no adhered substance was recognized on the disk, and the occurrence of corrosion or a pinhole was not recognized on the disk.

EXAMPLE 5

The forming process of the magnetic disk, for other examples of this invention, is shown from FIG. 7A to FIG. 7E.

Figure 7A:
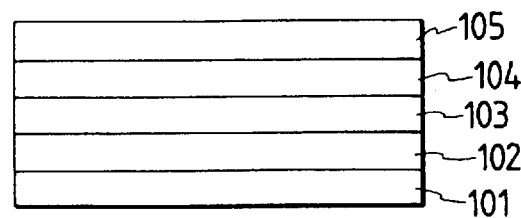
FIGS. 7A, 7B, 7C, 7D and 7E show the forming process steps of the process for forming the magnetic disk of this invention.

In the first process step shown in FIG. 7A, on the surface of an Al alloy substrate 101 having an outer diameter of 3.5 inches and a thickness of 0.8 mm NiP, an under-layer 102 of 15 μm was formed by an electroless deposition method. A mirror surface polishing was performed for this under-layer 102 by 10 μm while measuring the roughness by means of a contact profilometer. The underlayer 102 was polished so that the average (Ra) of the roughness became 2 nm and the maximum (Rmax) of the roughness became about 7 μm. On the substrate, the thickness of each of the following films was formed by the sputtering method, i.e. a Cr intermediate layer 103 of 100 nm, a CoCr magnetic layer 104 of 30 nm, and an amorphous C protective layer 105 of 30 nm.

Figure 7B:
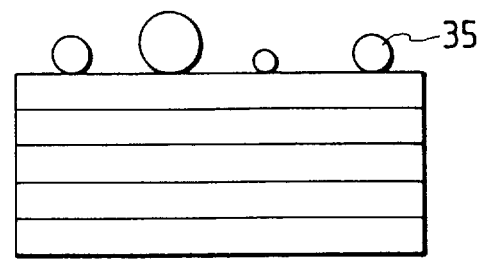

In the second process step shown in FIG. 7B, PTFE particles 35 having an average grain diameter of 2 μm, were suspended in a fluorine containing solvent at the rate of 1 wt % by an ultrasonic method. On the surface of the C protective layer suspension was coated with electrostatic spray, and the solvent was evaporated to disperse the PTFE particles on the substrate.

Figure 7C:
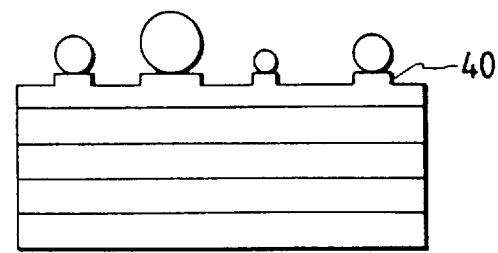

In the third process step shown in FIG. 7C, this disk was etched for 10 seconds at rf 100 W electric power with $O_2$ gas, and projections 40 having a height of 10 nm were formed on protective layer 105.

Figure 7D:
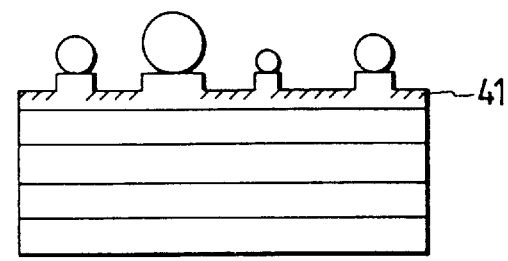

In the fourth process step shown in FIG. 7D, gas plasma processing was carried out on this disk for 10 seconds at rf 100 W electric power in an Ar atmosphere.

Figure 7E:
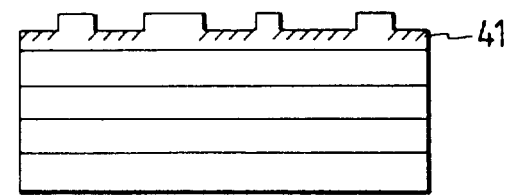

In the fifth process step shown in FIG. 7E, the disk was washed with an ultrasonic spray of pure water, and then the PTFE particles moisture were removed in the warm air drying.

Then, the perfluoropolyether lubricant was coated on the obtained disk, and lubricating layer 43 of the film thickness of about 4 nm was formed. When this magnetic disk was observed under the optical microscope, 0.1 to 5 μm of the diameter of projections were 95% of the whole projections, the whole area ratio of the projection part was about 2%, the average of the projection pitch was about 7 μm, and the average of the density of the number of projections was about 6500N/mm². When it was measured by the contact profilometer, it was confirmed that the projections of the almost constant height of about 15 μm height was formed over the surface of the magnetic disk.

The surface of this magnetic disk was analyzed by XPS. The spot diameter of XPS was narrowed down to 5 μm. Densities of the summit part of projections and recess 41 between projections were measured, so that the XPS peak intensity of C became large for the summit part. As a result, it was confirmed that the density of the surface layer of the protective layer was increased.

EXAMPLE 6

The amorphous C film 105 of Example 5 can be placed by diamond like C film manufactured by the plasma CVD method or the hydrogen containing C film manufactured by the sputtering method in which $CH_4$ is introduced into the atmosphere.

EXAMPLE 7

The process of Example 5 was repeated, except the suspension of the PTFE particles in a fluorine containing solvent was substituted with the suspension of alumina particles of a diameter of 2 μm was eliminated using methyl ethyl ketone of 1 wt %. The projections were formed in the surface of the protective layer in the same manner as Example 5.

The area ratio of the projection part per the area of the disk was about 5%, the average of the projection pitch was about 1 μm, and the average of the number of projections was about 1600000N/mm².

A result similar to Example 5 was obtained in this case.

EXAMPLE 8

In Example 5, the Ra of the NiP under-layer becomes about 0.5 μm and mirror surface polishing is performed so that the Rmax becomes about 1.5 μm. The Cr intermediate layer 103 and magnetic layer 104 are formed similar to Example 5. A film 105 forming a protective layer of thickness 10 nm is formed by the plasma CVD method.

On the surface of this protective layer, a suspension of PTFE particles having a dispersed average grain diameter of 2 μm is provided by a fluorine containing solvent in 5 wt % as a coating similar to Example 5, and projections are formed on the protective layer similar to Example 5. In this case, the etching quantity by $O_2$ becomes 3 nm, and the recess film thickness reduction by the Ar plasma processing becomes 2 nm. The rf electric power and the processing time of each process are adjusted, and projections of 5 nm are formed. The area ratio of the projection part is about 25%, the average of the projection pitch is about 2 μm, and the density of the number of projections is about 80000N/mm². A lubricating layer having a film thickness of about 2 nm is formed on this magnetic disk, and it is mounted on a magnetic disk apparatus having a flying height of 20 nm, so that a seek test similar to example 5 is performed.

EXAMPLE 9

PTFE particles having an average grain diameter of 0.3 μm were coated on a substrate with an electrostatic spray. A disk with projections similar to those of Example 5 was manufactured. When this magnetic disk was observed under an optical microscope, projections having a diameter of 0.05 to 1 μm occupied 95% of the surface. When the optical microscope photograph of the whole area ratio of the projection part was checked by image processing, the whole area ratio was about 1–1.5%, and the average of the projection pitch was about 5 μm. This magnetic disk was mounted on the magnetic disk apparatus of FIG. 3, and a seek test was performed by using a MR head having a flying height of 30 nm and a magnetic head. Even after 2000 hours, the ability write and read was not changed.

EXAMPLE 10

The suspensions of SiC particles having an average grain diameter of 0.5 μm in alcohol and of $SiO_2$ having an average grain diameter of 0.1 μm in alcohol, are used to form projections on the protective layer surface. The area ratio of the projection part is about 1.5%.

What is claimed is:

1. A magnetic recording medium comprising, in this order, a nonmagnetic substrate, an underlayer, a metal thin film magnetic layer and a protective layer, the protective layer having (1) a surface opposite the side adjacent the magnetic layer and (2) a remainder;

wherein the electrical resistivity of the surface of the protective layer opposite the side adjacent the magnetic layer is higher than the electrical resistivity of the remainder of the protective layer.

2. A magnetic recording medium comprising, in this order, a nonmagnetic substrate, an underlayer, a metal thin film magnetic layer and a protective layer, the protective layer having (1) a surface opposite the side adjacent the magnetic layer and (2) a remainder;

wherein the density of the surface of the protective layer opposite the side adjacent the magnetic layer is higher than the density of the remainder of the protective layer.

3. A magnetic recording medium comprising, in this order, a nonmagnetic substrate, an underlayer, a metal thin film magnetic layer and a protective layer, the protective layer having (1) a surface opposite the side adjacent the magnetic layer and (2) a remainder;

wherein the electrical resistivity and the density of the surface of the protective layer opposite the side adjacent the magnetic layer are higher than the electrical resistivity and the density of the remainder of the protective layer.

4. A magnetic recording medium comprising, in this order, a nonmagnetic substrate, an underlayer, a metal thin film magnetic layer, a protective layer and a lubricant layer, the protective layer having (1) a surface opposite the side adjacent the magnetic layer and (2) a remainder;

wherein the electrical resistivity and the density of the surface of the protective layer opposite the side adjacent the magnetic layer are higher than the electrical resistivity and the density of the remainder of the protective layer.

5. The magnetic recording medium as defined in claim 1 or 3 or 4, wherein the protective layer disposed on the magnetic layer is a sputtered protective layer or plasma chemical vapor deposition protective layer and the surface having the higher electrical resistivity is a plasma processed surface.

6. A magnetic recording medium comprising, in this order, a nonmagnetic substrate, an underlayer, a metal thin film magnetic layer and a protective layer, the protective layer having a surface opposite the side adjacent the magnetic layer, the protective layer extending in a thickness direction which is perpendicular to said surface;

wherein the electrical resistivity of the surface of the protective layer opposite the side adjacent the magnetic layer is higher than the average electrical resistivity of the remainder of the protective layer.

7. A magnetic recording medium comprising, in this order, a nonmagnetic substrate, an underlayer, a metal thin film magnetic layer and a protective layer, the protective layer having a surface opposite the side adjacent the magnetic layer;

wherein the density of the surface of the protective layer is higher than the average density of the remainder of the protective layer.

8. A magnetic recording medium comprising, in this order, a nonmagnetic substrate, an underlayer, a metal thin film magnetic layer and a protective layer, the protective layer having a surface opposite the side adjacent the magnetic layer, the protective layer extending in a thickness direction which is perpendicular to said surface;

wherein the electrical resistivity of the protective layer changes in said thickness direction, from the magnetic layer to the surface of the protective layer opposite the side adjacent the magnetic layer, and the electrical resistivity at the surface is higher than the average electrical resistivity in the remainder of the protective layer, and the density of the surface of the protective layer is higher than the average density of the remainder of the protective layer.

9. A magnetic recording medium comprising, in this order, a nonmagnetic substrate, an underlayer, a metal thin film magnetic layer, a protective layer and a lubricant layer, the protective layer having a surface opposite to the side adjacent the magnetic layer, the protective layer extending in a thickness direction which is perpendicular to said surface;

wherein electrical resistivity of the surface of the protective layer is higher than the average electrical resistivity in the remainder of the protective layer, and the density of the surface of the protective layer is higher than the average density of the remainder of the protective layer.

10. The magnetic recording medium as defined in claim 6 or 8 or 9, wherein the protective layer disposed on the magnetic layer is a sputtered protective layer or plasma chemical vapor deposition protective layer and the surface having the higher electrical resistivity is a plasma processed surface.

11. A magnetic recording medium comprising, in this order, a nonmagnetic substrate, an underlayer, a metal thin film magnetic layer and a protective layer, the protective layer having a surface opposite the side adjacent the magnetic layer;

wherein the electrical resistivity of portions of the surface of the protective layer is larger than the electrical resistivity of other portions of the surface of the protective layer.

12. A magnetic recording medium according to claim 11, further comprising a lubricant layer on the protective layer.

13. A magnetic recording medium according to claim 1 or 2 or 3 or 11, wherein the surface of the protective layer is a plasma processed surface, thereby forming a modified surface portion of the protective layer.

14. A magnetic recording medium according to claim 13, wherein the plasma processed surface is a surface subjected to gas plasma processing, a gas for the gas plasma processing being selected from the group consisting of Ar, He, Ne, $N_2$, carbon fluoride gases and hydrogen, and mixtures thereof.

15. A magnetic recording medium according to claim 14, wherein the modified surface portion extends into the protective layer at most 30% of the thickness of the protective layer.

16. A magnetic recording medium comprising, in this order, a nonmagnetic substrate, an underlayer, a metal thin film magnetic layer and a protective layer, the protective layer having (1) a surface opposite the side adjacent the magnetic layer and (2) a remainder;

wherein the thickness of the protective layer is nonuniform, the surface of the protective layer contains projections and recess portions, and the electrical resistivity of the recess portions of the surface is higher than the electrical resistivity of the remainder of the protective layer.

17. A magnetic recording medium comprising, in this order, a nonmagnetic substrate, an underlayer, a metal thin film magnetic layer and a protective layer, the protective layer having (1) a surface opposite the side adjacent the magnetic layer and (2) a remainder;

wherein the thickness of the protective layer is nonuniform, the surface of the protective layer contains projections and recess portions, and the density of the recess portions of the surface is higher than the density of the remainder of the protective layer.

18. A magnetic recording medium comprising, in this order, a nonmagnetic substrate, an underlayer, a metal thin film magnetic layer and a protective layer, the protective layer having (1) a surface opposite the side adjacent the magnetic layer and (2) a remainder;

wherein the thickness of the protective layer is nonuniform, the surface of the protective layer contains projections and recess portions, and the electrical resistivity and the density of the recess portions of the surface are higher than the electrical resistivity and the density of the remainder of the protective layer.

19. A magnetic recording medium comprising, in this order, a nonmagnetic substrate, an underlayer, a metal thin film magnetic layer, a protective layer and a lubricant layer, the protective layer having (1) a surface opposite the side adjacent the magnetic layer and (2) a remainder;

wherein the thickness of the protective layer is nonuniform, the surface of the protective layer contains projections and recess portions, and the electrical resistivity of the recess portions of the surface is higher than the electrical resistivity of the remainder of the protective layer.

20. A magnetic recording medium comprising, in this order, a nonmagnetic substrate, an underlayer, a metal thin film magnetic layer, a protective layer and a lubricant layer, the protective layer having (1) a surface opposite the side adjacent the magnetic layer and (2) a remainder;

wherein the thickness of the protective layer is nonuniform, the surface of the protective layer contains projections and recess portions, and the density of the recess portions of the surface is higher than the density of the remainder of the protective layer.

21. A magnetic recording medium comprising, in this order, a nonmagnetic substrate, an underlayer, a metal thin film magnetic layer, a protective layer and a lubricant layer, the protective layer having (1) a surface opposite the side adjacent the magnetic layer and (2) a remainder;

wherein the thickness of the protective layer is nonuniform, the surface of the protective layer contains projections and recess portions, and the electrical resistivity and the density of the recess portions of the surface are higher than the electrical resistivity and the density of the remainder of the protective layer.

22. A magnetic recording medium according to any one of claims 16 to 21, wherein the surface of the magnetic layer is flat, and the projections have a uniform height.

23. A magnetic recording medium according to any one of claims 16 to 21, wherein the surface of the magnetic layer is flat, the projections have a uniform height, and the number of the projections per unit area is 100 to 20,000,000 per $mm^2$.

24. A magnetic recording medium according to any one of claims 16 to 21, wherein the surface of the protective layer comprises at least one element of at least one gas used for plasma processing of the protective layer.

25. A magnetic recording medium according to any one of claims 16 to 21, wherein the recess portions of the surface have been subjected to plasma processing.

26. A magnetic recording medium according to any one of claims 16 to 21, wherein the projections have a height in the range of 10–30 nm.

27. A magnetic recording medium according to claim 16 or 19, wherein the electrical resistivity of the recess portions of the surface is also higher than the electrical resistivity of the projections of the surface.

28. A magnetic recording medium according to claim 17 or 20, wherein the density, in mass per volume, of the recess portions of the surface is also higher than the density, in mass per volume, of the projections of the surface.

29. A magnetic recording medium according to claim 18 or 22, wherein the electrical resistivity, and the density in mass per volume, of the recess portions of the surface are both also higher than the electrical resistivity, and the density in mass per volume, of the projections of the surface.

* * * * *